US012782965B2

(12) United States Patent
Du et al.

(10) Patent No.: US 12,782,965 B2
(45) Date of Patent: Nov. 3, 2026

(54) MOWING METHOD AND APPARATUS, ROBOTIC LAWN MOWER, AND STORAGE MEDIUM

(71) Applicant: SHENZHEN MAMMOTION INNOVATION CO., LIMITED, Shenzhen (CN)

(72) Inventors: Pengju Du, Shenzhen (CN); Ning Wang, Shenzhen (CN); Zhenhao Huang, Shenzhen (CN)

(73) Assignee: SHENZHEN MAMMOTION INNOVATION CO., LIMITED, Shenzhen (CN)

( * ) Notice: Subject to any disclaimer, the term of this patent is extended or adjusted under 35 U.S.C. 154(b) by 14 days.

(21) Appl. No.: 19/008,400

(22) Filed: Jan. 2, 2025

(65) Prior Publication Data

US 2025/0172945 A1 May 29, 2025

Related U.S. Application Data

(63) Continuation of application No. PCT/CN2023/105199, filed on Jun. 30, 2023.

(30) Foreign Application Priority Data

Jul. 6, 2022 (CN) ........................ 202210798876.X

(51) Int. Cl.
*G05D 1/646* (2024.01)
*A01D 34/00* (2006.01)
(Continued)

(52) U.S. Cl.
CPC ........... *G05D 1/646* (2024.01); *A01D 34/008* (2013.01); *G05D 1/648* (2024.01);
(Continued)

(58) Field of Classification Search
CPC .... G05D 1/646; G05D 1/648; G05D 2105/15; G05D 2107/23; A01D 34/008; A01D 2101/00
See application file for complete search history.

(56) References Cited

U.S. PATENT DOCUMENTS 5,444,965 A 8/1995 Colens
8,818,602 B2 8/2014 Yamamura et al.
(Continued)

FOREIGN PATENT DOCUMENTS

CN 103054519 A 4/2013
CN 110018686 A 7/2019
(Continued)

OTHER PUBLICATIONS

CN110879596A machine translation (Year: 2020).*
(Continued)

*Primary Examiner* — Navid Z. Mehdizadeh
*Assistant Examiner* — Oliver Tan
(74) *Attorney, Agent, or Firm* — Getech Law LLC; Jun Ye

(57) ABSTRACT

The present disclosure discloses a mowing method that includes: obtaining a preset mowing region; identifying a first region and a second region in the mowing region according to a preset spiral mowing mode, where the first region is a spiral mowing region; generating a spiral mowing route corresponding to the first region, and generating a square wave-shaped mowing route corresponding to the second region based on a mowing trend corresponding to the spiral mowing route; and in response to a mowing trigger request for a robotic lawn mower, performing a mowing operation in the mowing region according to the spiral mowing route and the square wave-shaped mowing route.

9 Claims, 4 Drawing Sheets

(51) Int. Cl.

| | |
|---|---|
| ***A01D 101/00*** | (2006.01) |
| ***G05D 1/648*** | (2024.01) |
| ***G05D 105/15*** | (2024.01) |
| ***G05D 107/20*** | (2024.01) |

(52) U.S. Cl.

CPC ..... *A01D 2101/00* (2013.01); *G05D 2105/15* (2024.01); *G05D 2107/23* (2024.01)

(56) References Cited

U.S. PATENT DOCUMENTS

| | | | | |
|---|---|---|---|---|
| 9,072,218 | B2 | 7/2015 | Johnson et al. | |
| 2005/0273253 | A1 | 12/2005 | Diekhans et al. | |
| 2016/0174459 | A1* | 6/2016 | Balutis | A01D 34/008 701/25 |
| 2018/0116105 | A1 | 5/2018 | Balutis et al. | |
| 2019/0146513 | A1* | 5/2019 | Tomita | A01B 69/008 701/50 |
| 2020/0275604 | A1* | 9/2020 | Chen | G01S 19/43 |
| 2022/0007565 | A1 | 1/2022 | Wu et al. | |

FOREIGN PATENT DOCUMENTS

| | | | | |
|---|---|---|---|---|
| CN | 110879596 | A * | 3/2020 | G05D 1/0236 |
| CN | 111329383 | A | 6/2020 | |
| CN | 111386030 | A | 7/2020 | |
| CN | 111578943 | A | 8/2020 | |
| CN | 113485334 | A | 10/2021 | |
| CN | 113974494 | A | 1/2022 | |
| CN | 114019956 | A | 2/2022 | |
| CN | 115088463 | A | 9/2022 | |
| DE | 19932552 | C2 | 8/2002 | |
| JP | 2000014208 | A | 1/2000 | |
| JP | 2019110762 | A | 7/2019 | |
| JP | 2022081791 | A | 6/2022 | |
| RU | 2738296 | C1 | 12/2020 | |
| WO | 2019096264 | A1 | 5/2019 | |
| WO | 2019194634 | A1 | 10/2019 | |
| WO | 2022004474 | A1 | 1/2022 | |

OTHER PUBLICATIONS

CN202210798876.X—First Office Action Mailed on Jun. 13, 2023, 17 pages.

CN202210798876.X—Second Office Action Mailed on Dec. 22, 2023, 21 pages.

EP23834785.0—Extended European Search Report Mailed on Aug. 26, 2025, 9 pages.

PCT/CN2023/105199—International Search Report and Written Opinion mailed on Sep. 20, 2023, 16 pages.

* cited by examiner

MOWING METHOD AND APPARATUS, ROBOTIC LAWN MOWER, AND STORAGE MEDIUM

CROSS-REFERENCE TO RELATED APPLICATIONS

The present application is a continuation of International Application No. PCT/CN2023/105199, filed on Jun. 30, 2023, which claims the priority to Chinese Patent Application No. CN202210798876.X, filed in the China National Intellectual Property Administration on Jul. 6, 2022, and entitled "MOWING METHOD AND APPARATUS, ROBOTIC LAWN MOWER, AND STORAGE MEDIUM", both of which are incorporated herein by reference in their entirety.

TECHNICAL FIELD

The present application relates to the field of computer technology, and particularly to a mowing method and apparatus, a robotic lawn mower, and a storage medium.

BACKGROUND OF THE INVENTION

Robotic lawn mowers are widely used for maintaining home yard lawns and trimming large grasslands. The robotic lawn mowers incorporate techniques such as motion control, multi-sensor fusion, and path planning. In order to control a robotic lawn mower to implement a mowing operation, a mowing path needs to be planned for the robotic lawn mower so that all operation regions are completely covered.

However, random path planning is currently employed by most of robotic lawn mowers for mowing, and such robotic lawn mowers often miss spots or mow the same areas multiple times during a mowing operation due to the randomness of their path planning. It can be seen therefrom that the current mowing solution results in low working area coverage and low mowing efficiency.

SUMMARY OF THE INVENTION

According to various embodiments of the present disclosure, an intelligent obstacle avoidance method, a robotic lawn mower, and a storage medium are provided.

In a first aspect, an embodiment of the present disclosure provides a mowing method, including:

obtaining a preset mowing region;

identifying a first region and a second region in the mowing region according to a preset spiral mowing mode, where the first region is a spiral mowing region, and the first region surrounds the second region;

generating a spiral mowing route corresponding to the first region, and generating a square wave-shaped mowing route corresponding to the second region based on a mowing trend corresponding to the spiral mowing route; and in response to a mowing trigger request for a robotic lawn mower, performing a mowing operation in the mowing region according to the spiral mowing route and the square wave-shaped mowing route.

In a second aspect, an embodiment of the present disclosure provides a mowing apparatus, comprising:

an obtaining unit configured to obtain a preset mowing region;

an identifying unit configured to identify a first region and a second region in the mowing region according to a preset spiral mowing mode, where the first region is a spiral mowing region, and the first region surrounds the second region;

a first generation unit configured to generate a spiral mowing route corresponding to the first region;

a second generation unit configured to generate a square wave-shaped mowing route corresponding to the second region based on a mowing trend corresponding to the spiral mowing route; and a mowing unit configured to, in response to a mowing trigger request for a robotic lawn mower, perform a mowing operation in the mowing region according to the spiral mowing route and the square wave-shaped mowing route.

BRIEF DESCRIPTION OF DRAWINGS

In order to more clearly describe the technical solutions in the embodiments of the present disclosure, the accompanying drawings necessary for describing the embodiments will be briefly described below. Apparently, the accompanying drawings in the description below merely show some of the embodiments of the present disclosure, and those skilled in the art would have obtained other drawings from these drawings without involving any inventive effort.

DETAILED DESCRIPTION OF THE INVENTION

Figure 1A:
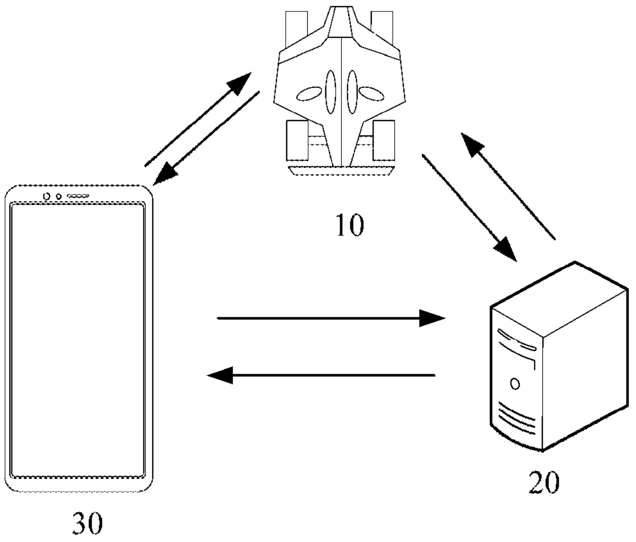
FIG. 1*a* is a schematic diagram of a scenario of a mowing method according to an embodiment of the present disclosure.

The technical solutions in the embodiments of the present disclosure will be described clearly and completely below with reference to the accompanying drawings in the embodiments of the present disclosure. Apparently, the embodiments described are only some rather than all of the embodiments of the present disclosure. All the other embodiments obtained by those skilled in the art based on the embodiments of the present disclosure without creative efforts shall fall within the scope of protection of the present disclosure.

It should be noted that when an element is referred to as being "fixed to" or "disposed" on another element, it may be directly on or indirectly on another element. When an element is referred to as being "connected" to another element, it may be directly or indirectly connected to another element. In addition, the connection may have the function of fixing or circuit connection.

It should be understood that the orientation or positional relationships indicated by the terms "length", "width", "upper", "lower", "front", "rear", "left", "right", "vertical", "horizontal", "top", "bottom", "inner", "outer", etc. are based on the orientation or positional relationship shown in the accompanying drawings and are only for facilitating the description of the embodiments of the present disclosure and simplifying the description, rather than indicating or implying that an apparatus or an element referred to must have a particular orientation or be constructed and operated in a particular orientation, and therefore will not be interpreted as limiting the present disclosure.

In addition, the terms "first" and "second" are merely used for the purpose of illustration, and cannot be construed as indicating or implying relative importance or implicitly indicating the number of technical features indicated. Thus, the features defined with "first" and "second" may explicitly or implicitly include one or more features. In the description of the embodiments of the present disclosure, "a plurality of" means two or more, unless specifically defined otherwise.

The embodiments of the present disclosure provide a mowing method and apparatus, a robotic lawn mower, and a storage medium.

The mowing apparatus may be integrated particularly into a microcontroller unit (MCU) of a robotic lawn mower, or integrated into an intelligent terminal or a server. The MCU, also referred as a single chip microcomputer or microcontroller, is designed to reduce the frequency and specifications of a central process unit (CPU) and integrate peripheral interfaces such as a memory, a timer, a USB, an analog-to-digital converter/digital-to-analog converter, a UART, a PLC, and a DMA to form a chip-level computer, to provide different combined controls for different applications. The robotic lawn mower may walk automatically, prevent collisions, and return for charging automatically within a range, is provided with safety detection and battery level detection, and has a climbing ability, which is particularly suitable for lawn trimming and maintenance in places such as home courtyards and public green space. It has the characteristics of: automatic mowing, grass clipping cleanup, automatic sheltering from a rain, automatic charging, automatic obstacle avoidance, small dimensions, electronic virtual fences, network control, etc.

The terminal may be a smartphone, a tablet, a laptop, a desktop computer, a smart speaker, a smart watch, etc., but not limited to those. The terminal and the server may be connected directly or indirectly by means of wired or wireless communication, the server may be a separate physical server, a server cluster or distributed system composed of a plurality of physical servers, or a cloud server that provides cloud services, cloud databases, cloud computing, cloud functions, cloud storage, network services, cloud communications, middleware services, domain name services, security services, CDNs, and basic cloud computing services such as big data and artificial intelligence platforms, which is not limited in the present disclosure.

For example, with reference to FIG. 1*a*, the present disclosure provides a mowing system, including a robotic lawn mower 10, a server 20, and user equipment 30 which are communicatively connected to each other. A user may control a movement of the robotic lawn mower 10 in advance through the user equipment 30, set a mowing region based on a movement trajectory, and synchronize data corresponding to the mowing region into the robotic lawn mower 10 and the server 20. The preset mowing region may be obtained, and then the robotic lawn mower 10 identifies a first region and a second region in the mowing region according to a preset spiral mowing mode, where the first region is a spiral mowing region. Next, a spiral mowing route corresponding to the first region is generated, and then a square wave-shaped mowing route corresponding to the second region is generated based on a mowing trend corresponding to the spiral mowing route. Finally, during a mowing operation, in response to a mowing trigger request for the robotic lawn mower 10, the mowing operation is performed in the mowing region according to the spiral mowing route and the square wave-shaped mowing route.

In the mowing solution provided by the present disclosure, the mowing method of combined spiral mowing and square wave-shaped mowing is used to avoid the problem of a low mowing efficiency caused by difficulty in making a turn in a central region during the spiral mowing, so that mowing can be flexibly performed in the mowing region, which improves the working area coverage and the mowing efficiency.

Detailed descriptions are provided below. It should be note that the order in which the following embodiments are described is not intended to limit the order of precedence of the embodiments.

A mowing method comprises: obtaining a preset mowing region; identifying a first region and a second region in the mowing region according to a preset spiral mowing mode; generating a spiral mowing route corresponding to the first region, and generating a square wave-shaped mowing route corresponding to the second region based on a mowing trend corresponding to the spiral mowing route; and in response to a mowing trigger request for a robotic lawn mower, performing a mowing operation in the mowing region according to the spiral mowing route and the square wave-shaped mowing route.

Figure 1B:
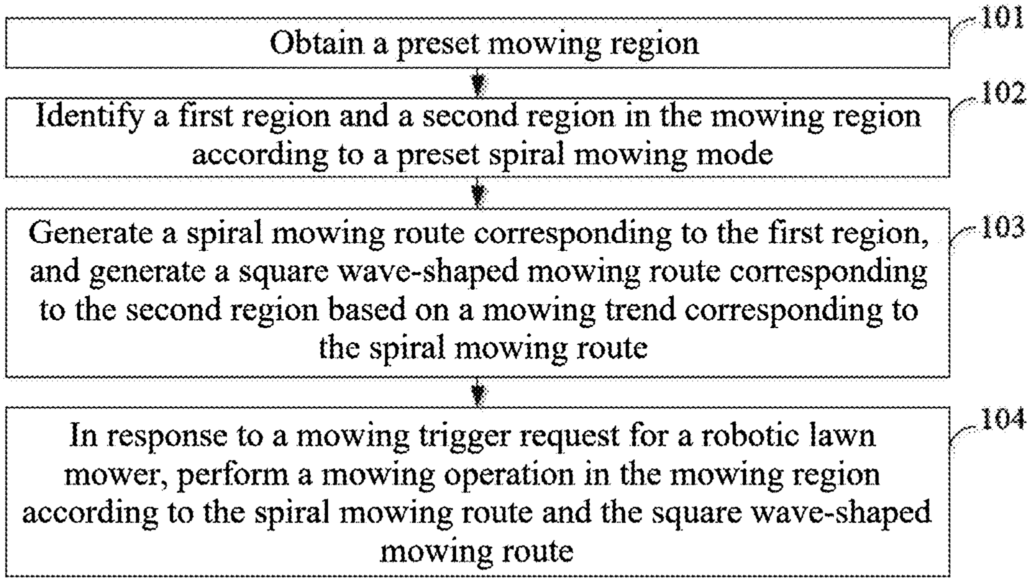
FIG. 1*b* is a schematic flowchart of a mowing method according to an embodiment of the present disclosure.

With reference to FIG. 1*b*, FIG. 1*b* is a schematic flowchart of a mowing method according to an embodiment of the present disclosure. A specific process of the mowing method may be as follows.

101: Obtaining a preset mowing region.

The mowing region may be a region encircled beforehand by the user in a mowing map, or may be determined based on differential positioning data and satellite positioning data of the robotic lawn mower, which may be specifically determined according to actual situations. There may be one or more mowing regions, and both the shape and size of the mowing region may be preset by the user.

For example, the mowing map corresponding to the robotic lawn mower is determined based on the satellite positioning data, and then the mowing region is identified in the mowing map in response to a region identifying operation for the mowing map. For another example, the user can control the movement of the robotic lawn mower in advance through the user device, and set the mowing region based on the movement trajectory.

102: Identifying a first region and a second region in the mowing region according to a preset spiral mowing mode.

Figure 1C:
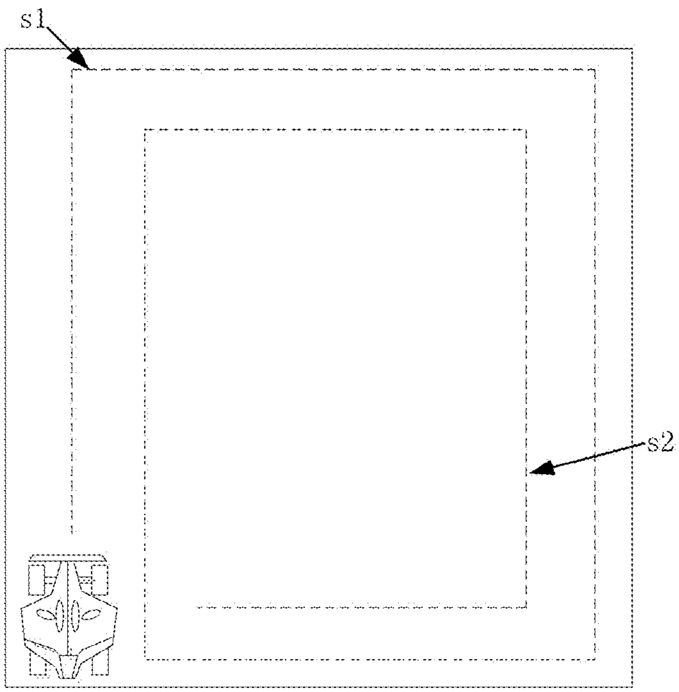
FIGS. 1*c* to 1*g* are schematic diagrams of mowing routes according to the present disclosure.

The first region is a spiral mowing region, and the first region surrounds the second region. In the spiral mowing mode, the robotic lawn mower is controlled to perform mowing along a mowing boundary. As shown in FIG. 1*c*, in this mowing mode, the robotic lawn mower performs mowing along the mowing boundary a at the outermost loop, to form a first mowing path s1, then a second mowing path s2 is formed based on the first mowing path s1, and by parity of reasoning, a complete mowing route is formed finally.

It should be noted that since the robotic lawn mower itself has a size, when traveling to the center of the mowing region in the spiral mowing mode, the robotic lawn mower may have trouble in making a turn and thus fail in mowing. Therefore, in the present disclosure, the first region and the second region are identified in the mowing region, where the first region is a spiral mowing region.

Alternatively, in some embodiments, the step "identifying a first region and a second region in the mowing region according to a preset spiral mowing mode" may specifically include: identifying the first region and the second region in the mowing region based on turn radius information of the robotic lawn mower, and an area of the mowing region.

The turn radius information includes an area occupied by the robotic lawn mower for performing a turn operation, and a maximum possible turn angle. Alternatively, in some embodiments, the maximum turnable angle of the robotic lawn mower is 360°. In this case, the area occupied by the robotic lawn mower for performing the turn operation needs to be considered, in order to subsequently identify the first region and the second region in the mowing region.

Alternatively, in some embodiments, the shortest circumference of an innermost loop and (or) the radius of a minimum circumscribed circle of an innermost loop of the spiral mowing route may be preset based on the area occupied by the robotic lawn mower for performing the turn operation. As a result, the first region and the second region may be identified in the mowing region.

103: Generating a spiral mowing route corresponding to the first region, and generating a square wave-shaped mowing route corresponding to the second region based on a mowing trend corresponding to the spiral mowing route.

A mowing direction corresponding to the spiral mowing route may be preset, and then the spiral mowing route corresponding to the first region may be generated based on the mowing direction and information, such as the shape and the boundary, of the first region. That is, alternatively, the step "generating a spiral mowing route corresponding to the first region" may specifically include:

(21) obtaining a preset mowing direction and region information of the first region; and (22) generating the spiral mowing route corresponding to the first region based on the mowing direction, the region information, and a region boundary of the first region.

Figure 1D:
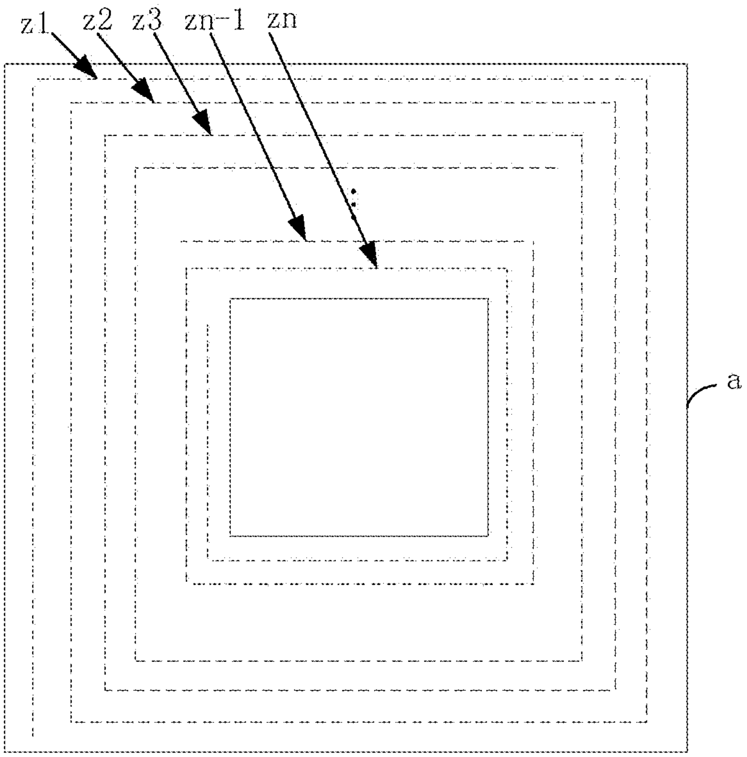

The region information may include details, such as the shape, the area, and the length of each boundary, of the mowing region. Specifically, with reference to FIG. 1*d*, a peripheral mowing path z1 is output based on the mowing direction and the region information of the first region T1, a second-section mowing path z2 is output based on the mowing path z1, and so on. It should be noted that a mowing path zn of the innermost loop is determined by a preceding mowing path zn-1 and the boundary a of the first region.

Furthermore, the spiral mowing route includes a plurality of route turning points for instructing the robotic lawn mower to make a turn. That is, alternatively, in some embodiments, the step "generating the spiral mowing route corresponding to the first region based on the mowing direction, the region information, and the region boundary of the first region" may specifically comprises:

(31) determining a first turning point based on the mowing direction and the region boundary of the first region; and (32) generating the spiral mowing route corresponding to the first region based on the first turning point, the region information, and the preset mowing direction.

The first turning point is determined based on the mowing direction and the region boundary on the outermost side of the first region, and the first turning point is used to indicate a position where a turn is made on the first-section mowing path. Subsequently, the remaining mowing path is output based on the first turning point, the region information, and the preset mowing direction. As a result, the spiral mowing route corresponding to the first region is obtained. Taking the second-section mowing path as an example, after the first turning point is determined, the second-section mowing path is output based on the first turning point and the preset mowing direction, and a route turning point on the second-section mowing path corresponds to the first turning point, so that the second-section mowing path is similar to the first-section mowing path.

Further, after the spiral mowing route is obtained, the square wave-shaped mowing route corresponding to the second region may be generated based on the spiral mowing route. That is, alternatively, in some embodiments, the step "generating a square wave-shaped mowing route corresponding to the second region based on a mowing trend corresponding to the spiral mowing route" may specifically comprises:

(41) outputting a target mowing direction corresponding to the square wave-shaped mowing route based on the mowing trend corresponding to the spiral mowing route and a region boundary of the second region; and (42) generating the square wave-shaped mowing route corresponding to the second region based on the target mowing direction.

It should be noted that the mowing trend corresponding to the spiral mowing route represents a final route orientation of the spiral mowing route. To generate the square wave-shaped mowing route adapted to the second region, the target mowing direction corresponding to the square wave-shaped mowing route may be output based on the mowing trend corresponding to the spiral mowing route and the region boundary of the second region. The target mowing direction is a toand-fro direction, which includes a first direction and a second direction, and the first direction is opposite to the second direction. Finally, the square wave-shaped mowing route adapted to the second region is generated based on the target mowing direction.

In order to reduce the number of turns made by the robotic lawn mower in the second region, thus increasing the mowing coverage, in some embodiments, a longest region boundary in the second region may be determined as a target boundary, and then the target mowing direction corresponding to the square wave-shaped mowing route may be output by using the target boundary as a reference. That is, the step "outputting a target mowing direction corresponding to the square wave-shaped mowing route based on the mowing trend corresponding to the spiral mowing route and a region boundary of the second region" may specifically include:

(51) determining a longest region boundary among the region boundaries of the second region as a target boundary; and (52) outputting the target mowing direction corresponding to the square wave-shaped mowing route by using the target boundary as a reference and based on the mowing trend corresponding to the spiral mowing route.

After the target mowing direction is determined, a second turning point may be determined on the region boundary of the second region, where the second turning point is a route turn-around point of the square wave-shaped mowing route. That is, the step "outputting the target mowing direction corresponding to the square wave-shaped mowing route by using the target boundary as a reference and based on the mowing trend corresponding to the spiral mowing route" may specifically include:

(61) determining a route end point of the spiral mowing route; and (62) determining a second turning point on the region boundary of the second region, and generating the square wave-shaped mowing route corresponding to the second region based on the route end point, the second turning point, and the target mowing direction.

Figure 1E:
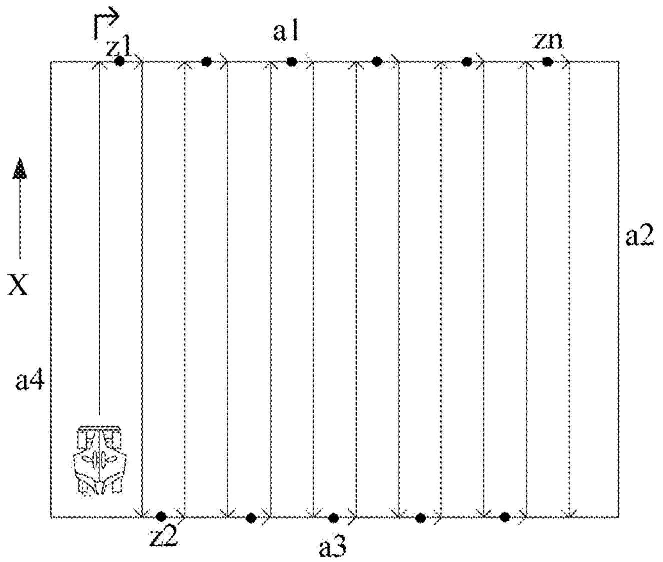

For example, with reference to FIG. 1*e*, the region boundaries of the second region are determined to be a boundary a1, a boundary a2, a boundary a3, and a boundary a4, the target mowing direction is X, and based on the mowing direction and the route end point, an intersection point between the robotic lawn mower and the mowing boundary as the robotic lawn mower travels in the target mowing direction is determined as the second turning point. For example, as shown in the figure, the intersection point between the robotic lawn mower and the mowing boundary as the robotic lawn mower travels in the target mowing direction is determined, and a target distance S by which the robotic lawn mower travels along the boundary is calculated based on the target mowing direction X. Consequently, a mowing turn-around point z1 may be determined to be located at the target distance S by which the intersection point a1 translates to the right, and then a next mowing turn-around point z2 is calculated. After all the mowing turn-around points are determined, the square wave-shaped mowing route z1-z2 . . . zn corresponding to the second region is generated based on a current mowing position.

Alternatively, in some embodiments, since the robotic lawn mower itself requires an area to make a turn, mowing coverage of an inner loop of the spiral mowing route is smaller than mowing coverage of an outer loop of the spiral mowing route, and accordingly, the square wave-shaped mowing route covering at least a part of the spiral mowing route may be generated, to increase the mowing coverage of the inner loop of the spiral mowing route. That is, the step "generating the square wave-shaped mowing route corresponding to the second region based on the target mowing direction" may specifically include:

(71) determining a route end point of the spiral mowing route; and (72) determining a route start point within a preset range from the route end point that is away from the second region;

(73) determining a third turning point based on the region boundary of the second region; and (74) generating, based on the route start point, the third turning point, and the target mowing direction, the square wave-shaped mowing route covering at least a part of the spiral mowing route.

Figure 1F:
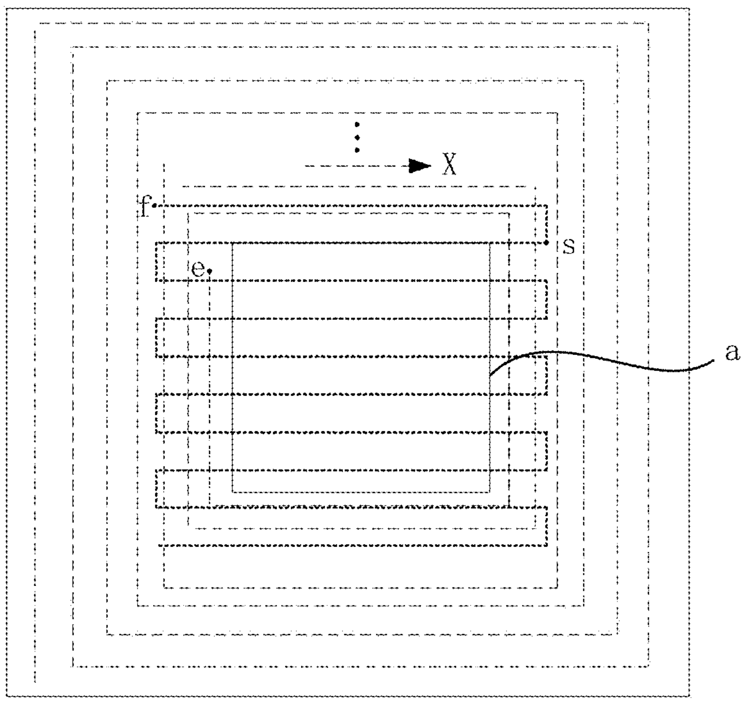
Figure 1G:
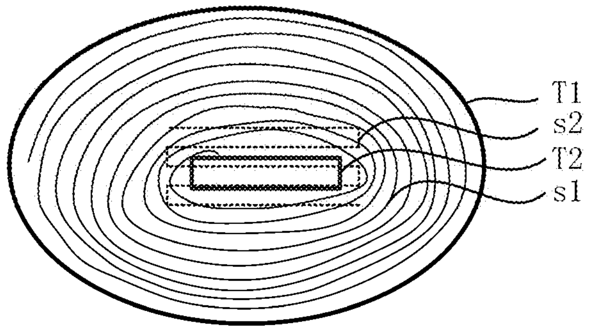

With reference to FIG. 1*g*, the route end point e of the spiral mowing route is determined, the route start point f is determined within the preset range from the route end point that is away from the second region, then the third turning point s is determined based on the region boundary a of the second region, and finally, the square wave-shaped mowing route covering at least a part of the spiral mowing route is generated based on the route start point f, the third turning point s, and the target mowing direction X, to increase the mowing coverage of the inner loop of the spiral mowing route.

Alternatively, in some embodiments, the shape of the first region may be rectangular, circular, or elliptical, and the shape of the second region may be rectangular. For example, when the shape of the first region and the shape of the second region are both rectangular, the generated mowing route is as shown in FIG. 1*f*. For another example, when the shape of the first region T1 is circular and the shape of the second region T2 is rectangular, the spiral mowing route s1 corresponding to the first region is in the shape of a mosquito coil, and to ensure the mowing coverage, the square wave-shaped mowing route s2 corresponding to the second region covers a part of the spiral mowing route s1, as shown in FIG. 1*g*.

104: In response to a mowing trigger request for a robotic lawn mower, perform a mowing operation in the mowing region according to the spiral mowing route and the square wave-shaped mowing route.

The mowing trigger request may be triggered by the robotic lawn mower itself, triggered by the server, or triggered by a user through hardware or software. For example, the robotic lawn mower needs to perform a timed operation, and the mowing trigger request is triggered within a set time. For another example, the server sends the mowing trigger request according to a reported mowing trigging instruction. Alternatively, the user may input mowing task information through an application on a mobile phone, and then the mobile phone may generate the mowing trigger request for the robotic lawn mower based on the mowing task information.

For example, the spiral mowing route and the square wave-shaped mowing route may be obtained from the mowing trigger request, to perform mowing in the first region by using the spiral mowing route and perform mowing in the second region by using the square wave-shaped mowing route. Alternatively, in some embodiments, the mowing operation may be performed first in the first region, and then performed in the second region, thus making it possible to ensure the coverage.

In this embodiment of the present disclosure, the robotic lawn mower, after obtaining the preset mowing region, identifies the first region and the second region in the mowing region according to the preset spiral mowing mode, where the first region is a spiral mowing region; then generates the spiral mowing route corresponding to the first region, and generates the square wave-shaped mowing route corresponding to the second region based on the mowing trend corresponding to the spiral mowing route; and finally, in response to the mowing trigger request for the robotic lawn mower, performs the mowing operation in the mowing region according to the spiral mowing route and the square wave-shaped mowing route. In the mowing solution provided by the present disclosure, the mowing method of combined spiral mowing and square wave-shaped mowing is used to avoid the problem of a low mowing efficiency resulting from the trouble in making a turn in a central region during the spiral mowing, so that mowing can be flexibly performed in the mowing region, which improves the working area coverage and the mowing efficiency.

Alternatively, in some embodiments, the generating a spiral mowing route corresponding to the first region includes:

obtaining a preset mowing direction and region information of the mowing region; and generating the spiral mowing route corresponding to the first region based on the mowing direction, the region information, and a region boundary of the first region.

Alternatively, in some embodiments, the generating the spiral mowing route corresponding to the first region based on the mowing direction, the region information, and a region boundary of the first region includes:

determining a first turning point based on the mowing direction and the region boundary of the first region; and generating the spiral mowing route corresponding to the first region based on the first turning point, the region information, and the preset mowing direction.

Alternatively, in some embodiments, the generating a square wave-shaped mowing route corresponding to the second region based on a mowing trend corresponding to the spiral mowing route includes:

outputting a target mowing direction corresponding to the square wave-shaped mowing route based on the mowing trend corresponding to the spiral mowing route and a region boundary of the second region; and generating the square wave-shaped mowing route corresponding to the second region based on the target mowing direction.

Alternatively, in some embodiments, the outputting a target mowing direction corresponding to the square wave-shaped mowing route based on the mowing trend corresponding to the spiral mowing route and a region boundary of the second region includes:

determining a longest region boundary among the region boundaries of the second region as a target boundary; and outputting the target mowing direction corresponding to the square wave-shaped mowing route by using the target boundary as a reference and based on the mowing trend corresponding to the spiral mowing route.

Alternatively, in some embodiments, the generating the square wave-shaped mowing route corresponding to the second region based on the target mowing direction includes:

determining a route end point of the spiral mowing route; and determining a second turning point on the region boundary of the second region, and generating the square wave-shaped mowing route corresponding to the second region based on the route end point, the second turning point, and the target mowing direction.

Alternatively, in some embodiments, the generating the square wave-shaped mowing route corresponding to the second region based on the target mowing direction includes:

determining a route end point of the spiral mowing route; and determining a route start point within a preset range from the route end point that is away from the second region;

determining a third turning point based on the region boundary of the second region; and generating, based on the route start point, the third turning point, and the target mowing direction, the square wave-shaped mowing route covering at least a part of the spiral mowing route.

Figure 2:
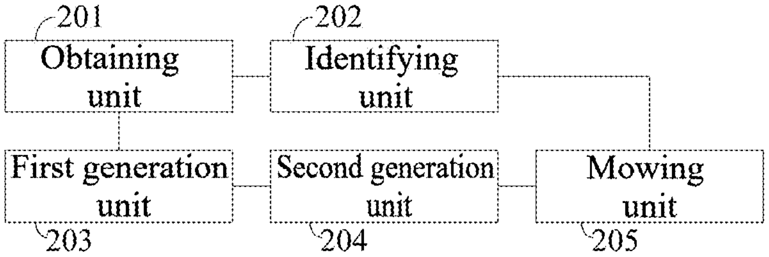
FIG. 2 is a schematic diagram of a structure of a mowing apparatus according to an embodiment of the present disclosure.

With reference to FIG. 2, FIG. 2 is a schematic diagram of a structure of a mowing apparatus according to an embodiment of the present disclosure, where the mowing apparatus may include an obtaining unit 201, an identifying unit 202, a first generation unit 203, a second generation unit 204, and a mowing unit 205, which may be specifically provided as follows.

The obtaining unit 201 is configured to obtain a preset mowing region.

The mowing region may be a region encircled beforehand by the user in a mowing map, or may be determined based on differential positioning data and satellite positioning data of the robotic lawn mower, which may be specifically determined according to actual situations. There may be one or more mowing regions, and both the shape and size of the mowing region may be preset by the user.

For another example, the user can control the movement of the robotic lawn mower in advance through the user equipment, and set the mowing region based on the movement trajectory. The obtaining unit 201 may obtain the preset mowing region by means of network connection, etc.

The identifying unit 202 is configured to identify a first region and a second region in the mowing region according to a preset spiral mowing mode.

The first region is a spiral mowing region, and the first region surrounds the second region. In the spiral mowing mode, the robotic lawn mower is controlled to perform mowing along a mowing boundary.

Alternatively, in some embodiments, the identifying unit 202 may preset the shortest circumference of an innermost loop and (or) the radius of a minimum circumscribed circle of an innermost loop of the spiral mowing route based on the area occupied by the robotic lawn mower for performing the turn operation. As such, the first region and the second region may be identified in the mowing region.

The first generation unit 203 is configured to generate a spiral mowing route corresponding to the first region.

A mowing direction corresponding to the spiral mowing route may be preset, and then the spiral mowing route corresponding to the first region may be generated based on the mowing direction and information, such as the shape and the boundary, of the first region. That is, Alternatively, in some embodiments, the first generation unit 203 may specifically include:

an obtaining unit configured to obtain a preset mowing direction and region information of the mowing region; and a first generation unit configured to generate the spiral mowing route corresponding to the first region based on the mowing direction, the region information, and a region boundary of the first region.

Alternatively, in some embodiments, the first generation unit may specifically be configured to: determine a first turning point based on the mowing direction and the region boundary of the first region; and generate the spiral mowing route corresponding to the first region based on the first turning point, the region information, and the preset mowing direction.

The second generation unit 204 is configured to generate a square wave-shaped mowing route corresponding to the second region based on a mowing trend corresponding to the spiral mowing route.

After the first generation unit 203 generates the spiral mowing route, the second generation unit 204 may generate the corresponding square wave-shaped mowing route based on the mowing trend corresponding to the spiral mowing route and a region boundary of the second region. That is, Alternatively, in some embodiments, the second generation unit 204 may specifically include:

an output unit configured to output a target mowing direction corresponding to the square wave-shaped mowing route based on the mowing trend corresponding to the spiral mowing route and a region boundary of the second region; and a second generation unit configured to generate the square wave-shaped mowing route corresponding to the second region based on the target mowing direction.

Alternatively, in some embodiments, the output unit may specifically be configured to: determine a longest region boundary among the region boundaries of the second region as a target boundary; and output the target mowing direction corresponding to the square wave-shaped mowing route by using the target boundary as a reference and based on the mowing trend corresponding to the spiral mowing route.

Alternatively, in some embodiments, the output unit may specifically be configured to: determine a route end point of the spiral mowing route; and determine a second turning point on the region boundary of the second region, and generate the square wave-shaped mowing route corresponding to the second region based on the route end point, the second turning point, and the target mowing direction.

Alternatively, in some embodiments, the second generation unit may specifically be configured to: determine a route end point of the spiral mowing route; and determine a second turning point on the region boundary of the second region, and generate the square wave-shaped mowing route corresponding to the second region based on the route end point, the second turning point, and the target mowing direction.

Alternatively, in some embodiments, the second generation unit may specifically be configured to: determine a route end point of the spiral mowing route; determine a route start point within a preset range from the route end point that is away from the second region; determine a third turning point based on the region boundary of the second region; and generate, based on the route start point, the third turning point, and the target mowing direction, the square wave-shaped mowing route covering at least a part of the spiral mowing route.

The mowing unit 204 is configured to, in response to a mowing trigger request for a robotic lawn mower, perform a mowing operation in the mowing region according to the spiral mowing route and the square wave-shaped mowing route.

The mowing trigger request may be triggered by the robotic lawn mower itself, triggered by the server, or triggered by a user through hardware or software. For example, the robotic lawn mower needs to perform a timed operation, and the mowing trigger request is triggered within a set time. For another example, the server sends the mowing trigger request according to a reported mowing trigging instruction. Alternatively, the user may input mowing task information through an application on a mobile phone, and then the mobile phone may generate the mowing trigger request for the robotic lawn mower based on the mowing task information.

For example, the mowing unit 204 may obtain the spiral mowing route and the square wave-shaped mowing route from the mowing trigger request, to perform mowing in the first region by using the spiral mowing route and perform mowing in the second region by using the square wave-shaped mowing route.

In this embodiment of the present disclosure, in the robotic lawn mower, after the obtaining unit 201 obtains the preset mowing region, the identifying unit 202 identifies the first region and the second region in the mowing region according to the preset spiral mowing mode, where the first region is a spiral mowing region; then the first generation unit 203 generates the spiral mowing route corresponding to the first region, and the second generation unit 204 generates the square wave-shaped mowing route corresponding to the second region based on the mowing trend corresponding to the spiral mowing route; and finally, in response to the mowing trigger request for the robotic lawn mower, the mowing unit 205 performs the mowing operation in the mowing region according to the spiral mowing route and the square wave-shaped mowing route. In the mowing solution provided by the present disclosure, the mowing method of combined spiral mowing and square wave-shaped mowing is used to avoid the problem of a low mowing efficiency resulting from the trouble in making a turn in a central region during the spiral mowing, so that mowing can be flexibly performed in the mowing region, which improves the working area coverage and the mowing efficiency.

Figure 3:
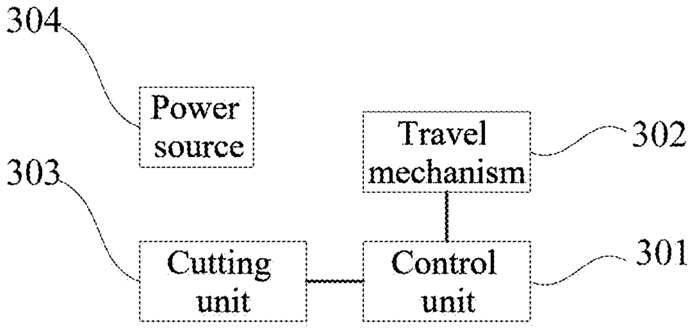
FIG. 3 is a schematic diagram of a structure of an electronic device according to an embodiment of the present disclosure.

In addition, an embodiment of the present disclosure further provides a robotic lawn mower. As shown in FIG. 3, a schematic diagram of a structure of the robotic lawn mower according to the embodiment of the present disclosure is shown, which is specifically as follows.

The robotic lawn mower may include components such as a control unit 301, a travel mechanism 302, a cutting unit 303, and a power source 304. Those skilled in the art will appreciate that the structure of the electronic device shown in FIG. 3 does not impose a limitation on the electronic device, and may include more or fewer components than those shown, a combination of some components or a different arrangement of components. Herein, the control unit 301 is a control center of the robotic lawn mower, the control unit 301 may specifically include components such as a central process unit (CPU), a memory, an input/output port, a system bus, a timer/counter, a digital-to-analog converter and an analog-to-digital converter. The CPU performs various functions of the robotic lawn mower and processes data by running or executing software programs and/or modules stored in the memory and calling the data stored in the memory. Preferably, the CPU can integrate an application processor and a modem processor, where the application processor mainly processes operating systems and applications, etc., and the modem processor mainly processes wireless communications. It may be understood that the above mentioned modem processor may alternatively not be integrated into the CPU.

The memory may be used to store software programs and modules, and the CPU executes various functional applications and processes data by running the software programs and modules stored in the memory. The memory may mainly include a program storage area and a data storage area, where the program storage area can store an operating system, an application required by at least one function (such as a sound play function and an image play function); and the data storage area can store data created during the use of the electronic device, etc. In addition, the memory may include a high-speed random access memory, and may also include a non-volatile memory, such as at least one disk storage device and a flash memory device, or other volatile solid-state storage devices. Accordingly, the memory may also include a memory controller to provide an access by the CPU to the memory.

The travel mechanism 302 is electrically connected to the control unit 301 for adjusting a travel speed and a travel direction of the robotic lawn mower in response to control signals transmitted by the control unit 301, to implement the self-moving function of the robotic lawn mower.

The mowing unit 303 is electrically connected to the control unit 301 and is configured to adjust the height and speed of the cutter disk in response to the control signals transmitted by the control unit, to implement the mowing operation.

The power source 304 may be logically connected to the control unit 301 through a power management system, to implement the functions, such as charging management, discharging management, and power consumption management, through the power management system. The power source 304 may also include any components such as one or more direct current or alternating current power source, a recharging system, a power failure detection circuit, a power converter or an inverter, and a power status indicator.

Although not shown, the robotic lawn mower may also include a communication unit, a sensor unit, a prompt unit, etc., which are not repeated herein.

The communication unit is configured to transmit and receive signals during information transmission and receiving, and to enable signal transmission and receiving with user equipment, a base station, or a server by means of communication connection with the user equipment, the base station, or the server.

The sensor unit is configured to collect internal or external environmental information, and to feed the collected environmental data back to the control unit for making a decision, thereby achieving the functions of precise positioning and intelligent obstacle avoidance of the robotic lawn mower. Alternatively, the sensor may include: an ultrasonic sensor, an infrared sensor, an impact sensor, a rain sensor, a lidar sensor, an inertial measurement unit, a tachometer, an image sensor, a position sensor, and other sensors, which are not limited herein.

The prompt unit is configured to indicate a current operating status of the robotic lawn mower to the user. In the robotic lawn mower provided by the embodiments of the present disclosure, the prompt unit includes, but is not limited to, an indicator light, a buzzer, and the like. For example, the robotic lawn mower can indicate to the user a current status of the power source, an operating status of an electric motor, an operating status of the sensor, etc. by means of the indicator light. For another example, if it is detected that the robotic lawn mower malfunctions or is stolen, an alert can be achieved by the buzzer.

Specifically, in the robotic lawn mower provided by this embodiment of the present disclosure, the processor in the control unit 301 loads executable files corresponding to processes of one or more applications into the memory, and then the processor runs the applications stored in the memory to implement various functions as follows:

obtaining a preset mowing region; identifying a first region and a second region in the mowing region according to a preset spiral mowing mode; generating a spiral mowing route corresponding to the first region, and generating a square wave-shaped mowing route corresponding to the second region based on a mowing trend corresponding to the spiral mowing route; and in response to a mowing trigger request for a robotic lawn mower, performing a mowing operation in the mowing region according to the spiral mowing route and the square wave-shaped mowing route.

For the implementations of the various operations above, reference may be made to the foregoing embodiments, which are not repeated herein.

In this embodiment of the present disclosure, the robotic lawn mower, after obtaining the preset mowing region, identifies the first region and the second region in the mowing region according to the preset spiral mowing mode, where the first region is a spiral mowing region; then generates the spiral mowing route corresponding to the first region, and generates the square wave-shaped mowing route corresponding to the second region based on the mowing trend corresponding to the spiral mowing route; and finally, in response to the mowing trigger request for the robotic lawn mower, performs the mowing operation in the mowing region according to the spiral mowing route and the square wave-shaped mowing route. In the mowing solution provided by the present disclosure, the mowing method of combined spiral mowing and square wave-shaped mowing is used to avoid the problem of a low mowing efficiency resulting from the trouble in making a turn in a central region during the spiral mowing, so that mowing can be flexibly performed in the mowing region, which improves the working area coverage and the mowing efficiency.

Those of ordinary skill in the art may understand that all or some of the steps of the various methods of the foregoing embodiments may be completed through instructions, or be completed by controlling related hardware through instructions, and the instructions may be stored in a computer-readable storage medium and loaded and executed by a processor.

To this end, an embodiment of the present disclosure provides a storage medium storing a plurality of instructions that can be loaded by a processor to cause the steps of any of the mowing methods provided in the embodiments of the present disclosure to be performed. For example, the instructions may cause the following steps to be performed:

determining a current mowing direction of a robotic lawn mower based on a historical mowing direction in response to a mowing trigger request for the robotic lawn mower, obtaining a preset mowing region, generating a square wave-shaped mowing route in the current mowing direction based on the mowing region, and a mowing mode and the current mowing direction of the robotic lawn mower, and controlling, based on the square wave-shaped mowing route, the robotic lawn mower to perform a mowing operation.

For the implementations of the various operations above, reference may be made to the foregoing embodiments, which are not repeated herein.

The storage medium may include: a read only memory (ROM), a random access memory (RAM), a magnetic disk, an optical disk, or the like.

Thanks to the instructions stored in the storage medium, the steps of any of the mowing methods provided in the embodiments of the present disclosure can be performed, and accordingly, the benefits achievable by any of the mowing methods provided in the embodiments of the present disclosure can be achieved. See the foregoing embodiments for details, which are not repeated herein.

In the embodiments of the present disclosure, after the preset mowing region is obtained, the first region and the second region are identified in the mowing region according to the preset spiral mowing mode, where the first region is a spiral mowing region; then the spiral mowing route corresponding to the first region is generated, and the square wave-shaped mowing route corresponding to the second region is generated based on the mowing trend corresponding to the spiral mowing route; and finally, in response to the mowing trigger request for the robotic lawn mower, the mowing operation is performed in the mowing region according to the spiral mowing route and the square wave-shaped mowing route. In the mowing solution provided by the present disclosure, the mowing method of combined spiral mowing and square wave-shaped mowing is used to avoid the problem of a low mowing efficiency resulting from the trouble in making a turn in a central region during the spiral mowing, so that mowing can be flexibly performed in the mowing region, which improves the working area coverage and the mowing efficiency.

The mowing method and apparatus, the robotic lawn mower, and the storage medium provided in the embodiments of the present disclosure are described in detail above, and the principles and implementations of the present disclosure are set forth with specific examples herein. The descriptions of the foregoing embodiments are merely intended to facilitate understanding of the method in the present disclosure and the core idea thereof. In addition, for those skilled in the art, variations may be made to the specific implementations and application range based on the idea of the present disclosure. In conclusion, the contents of this specification should not be construed as a limitation to the present disclosure.

What is claimed is:

1. A mowing method, comprising:

obtaining a preset mowing region;

identifying a first region and a second region in the mowing region according to a preset spiral mowing mode and based on an area occupied by a robotic lawn mower in performing a turn operation and an area of the mowing region, wherein the first region is a spiral mowing region, and the first region surrounds the second region, wherein one or both of a shortest circumference of an innermost loop of a spiral mowing route and a radius of a minimum circumscribed circle of the innermost loop are preset based on the area occupied by the robotic lawn mower for performing the turn operation, so that the first region and the second region are identified in the mowing region;

generating a spiral mowing route corresponding to the first region, and generating a square wave-shaped mowing route corresponding to the second region based on a mowing trend corresponding to the spiral mowing route, wherein generating the square wave-shaped mowing route comprises: determining a longest region boundary among region boundaries of the second region as a target boundary; outputting a target mowing direction corresponding to the square wave-shaped mowing route by using the target boundary as a reference and based on the mowing trend corresponding to the spiral mowing route; and generating the square wave-shaped mowing route corresponding to the second region based on the target mowing direction, wherein the mowing trend corresponding to the spiral mowing route represents a final route orientation of the spiral mowing route; and in response to a mowing trigger request for a robotic lawn mower, performing a mowing operation in the mowing region according to the spiral mowing route and the square wave-shaped mowing route.

2. The mowing method according to claim 1, wherein the generating the spiral mowing route corresponding to the first region comprises:

obtaining a preset mowing direction, and a region information of the mowing region; and generating the spiral mowing route corresponding to the first region based on the mowing direction, the region information, and a region boundary of the first region.

3. The mowing method according to claim 2, wherein the generating the spiral mowing route corresponding to the first region based on the mowing direction, the region information, and the region boundary of the first region comprises:

determining a first turning point based on the mowing direction and the region boundary of the first region; and generating the spiral mowing route corresponding to the first region based on the first turning point, the region information, and the preset mowing direction.

4. The mowing method according to claim 1, wherein the generating the square wave-shaped mowing route corresponding to the second region based on the target mowing direction comprises:

determining a route end point of the spiral mowing route; and determining a second turning point on the region boundary of the second region, and generating the square wave-shaped mowing route corresponding to the second region based on the route end point, the second turning point, and the target mowing direction.

5. The mowing method according to claim 1, wherein the generating the square wave-shaped mowing route corresponding to the second region based on the target mowing direction comprises:

determining a route end point of the spiral mowing route;

determining a route start point which is located within a preset range from the route end point and is away from the second region;

determining a third turning point based on the region boundary of the second region; and generating, based on the route start point, the third turning point, and the target mowing direction, the square wave-shaped mowing route covering at least a part of the spiral mowing route.

6. A robotic lawn mower, comprising:

a non-transitory memory, one or more processors, and instructions stored in the non-transitory memory and executable by the one or more processors, wherein the one or more processors, when executing the instructions, implement steps of a mowing method, wherein the mowing method comprises:

obtaining a preset mowing region;

identifying a first region and a second region in the mowing region according to a preset spiral mowing mode and based on an area occupied by the robotic lawn mower in performing a turn operation and an area of the mowing region, wherein the first region is a spiral mowing region, and the first region surrounds the second region, wherein one or both of a shortest circumference of an innermost loop of a spiral mowing route and a radius of a minimum circumscribed circle of the innermost loop are preset based on the area occupied by the robotic lawn mower for performing the turn operation, so that the first region and the second region are identified in the mowing region;

generating a spiral mowing route corresponding to the first region, and generating a square wave-shaped mowing route corresponding to the second region based on a mowing trend corresponding to the spiral mowing route, wherein generating the square wave-shaped mowing route comprises: determining a longest region boundary among region boundaries of the second region as a target boundary; outputting a target mowing direction corresponding to the square wave-shaped mowing route by using the target boundary as a reference and based on the mowing trend corresponding to the spiral mowing route; and generating the square wave-shaped mowing route corresponding to the second region based on the target mowing direction, wherein the mowing trend corresponding to the spiral mowing route represents a final route orientation of the spiral mowing route; and in response to a mowing trigger request for a robotic lawn mower, performing a mowing operation in the mowing region according to the spiral mowing route and the square wave-shaped mowing route.

7. The robotic lawn mower according to claim 6, wherein the generating the spiral mowing route corresponding to the first region comprises:

obtaining a preset mowing direction, and a region information of the mowing region; and generating the spiral mowing route corresponding to the first region based on the mowing direction, the region information, and a region boundary of the first region.

8. The robotic lawn mower according to claim 7, wherein the generating the spiral mowing route corresponding to the first region based on the mowing direction, the region information, and the region boundary of the first region comprises:

determining a first turning point based on the mowing direction and the region boundary of the first region; and generating the spiral mowing route corresponding to the first region based on the first turning point, the region information, and the preset mowing direction.

9. The robotic lawn mower according to claim 6, wherein the generating the square wave-shaped mowing route corresponding to the second region based on the target mowing direction comprises:

determining a route end point of the spiral mowing route; and determining a second turning point on the region boundary of the second region, and generating the square wave-shaped mowing route corresponding to the second region based on the route end point, the second turning point, and the target mowing direction.

* * * * *